US012449237B1

(12) United States Patent
Yan et al.

(10) Patent No.: US 12,449,237 B1
(45) Date of Patent: Oct. 21, 2025

(54) MOBILE LASER DENIAL DEFENSE SYSTEM

(71) Applicants: Hainan Research Institute of Zhejiang University, Sanya (CN); Hainan Tongling Technology Co., Ltd, Sanya (CN); Zhejiang University, Hangzhou (CN)

(72) Inventors: Yunfeng Yan, Sanya (CN); Guangxin Zhi, Sanya (CN); Xiangyu Wen, Sanya (CN); Donglian Qi, Sanya (CN); Xiaotian Chen, Sanya (CN)

(73) Assignee: Hainan Tongling Technology Co., Ltd, Sanya (CN)

( * ) Notice: Subject to any disclaimer, the term of this patent is extended or adjusted under 35 U.S.C. 154(b) by 0 days.

(21) Appl. No.: 19/235,646

(22) Filed: Jun. 12, 2025

(30) Foreign Application Priority Data

Nov. 5, 2024 (CN) .......................... 202411564175.5

(51) Int. Cl.
*F41H 13/00* (2006.01)
*B60R 16/033* (2006.01)
(Continued)

(52) U.S. Cl.
CPC ....... *F41H 13/0062* (2013.01); *B60R 16/033* (2013.01); *G05D 1/242* (2024.01); *G05D 1/243* (2024.01); *G05D 1/622* (2024.01); *G05D 1/689* (2024.01); *G06T 7/73* (2017.01); *G06V 10/30* (2022.01); *G06V 10/72* (2022.01);
(Continued)

(58) Field of Classification Search
CPC ........ G05D 1/689; G05D 1/242; G05D 1/622;
G05D 1/243; G06T 7/73; G06V 20/58;
G06V 10/30; G06V 10/72; H04N 23/695;
B60R 16/033; F41H 13/0043; F41H 13/0062
See application file for complete search history.

(56) References Cited

U.S. PATENT DOCUMENTS 9,696,123 B2 * 7/2017 Schlosser ................ G01S 13/58
2017/0059282 A1 * 3/2017 Schlosser .................. F41G 5/08
(Continued)

FOREIGN PATENT DOCUMENTS

CN 114046690 A 2/2022
CN 115388712 A 11/2022
JP 2021014958 A * 2/2021 ............. G06V 20/38

*Primary Examiner* — Benjamin P Lee
(74) *Attorney, Agent, or Firm* — Bayramoglu Law Offices LLC

(57) ABSTRACT

A mobile laser denial defense system is provided. A camera is in communication connection with an image processing device and a control device, and is configured for real-time monitoring and target identification; a laser is fixed on a pan/tilt head and is connected to a laser host by a telescopic optical fiber, where the laser is in communication connection with the control device; a cooling system is connected to the laser and is configured to cool and dissipate heat from the laser; a control device is connected to a camera and the laser and configured to identify a target and control the laser to perform laser strikes, where the control device is also connected to the cooling system to monitor a temperature state of the cooling system in real time; and an automatic cruise and obstacle avoidance system is integrated in a mobile base.

1 Claim, 3 Drawing Sheets

(51) Int. Cl.
  *G05D 1/242*   (2024.01)
  *G05D 1/243*   (2024.01)
  *G05D 1/622*   (2024.01)
  *G05D 1/689*   (2024.01)
  *G06T 7/73*    (2017.01)
  *G06V 10/30*   (2022.01)
  *G06V 10/72*   (2022.01)
  *G06V 20/58*   (2022.01)
  *H04N 23/695*  (2023.01)
  *B62D 63/02*       (2006.01)
  *G05D 105/35*      (2024.01)

(52) U.S. Cl.
  CPC ........... *G06V 20/58* (2022.01); *H04N 23/695* (2023.01); *B62D 63/02* (2013.01); *G05D 2105/35* (2024.01); *G06T 2207/30261* (2013.01); *G06V 2201/07* (2022.01)

(56) References Cited

U.S. PATENT DOCUMENTS

2020/0339354 A1   10/2020  Soto Arriaza
2021/0231414 A1*  7/2021  Ochiai ................ F41H 13/0062
2024/0328757 A1*  10/2024  Hamamoto ............. F41H 13/00

* cited by examiner

MOBILE LASER DENIAL DEFENSE SYSTEM

CROSS REFERENCE TO THE RELATED APPLICATIONS

This application is based upon and claims priority to Chinese Patent Application No. 202411564175.5, filed on Nov. 5, 2024, the entire contents of which are incorporated herein by reference.

TECHNICAL FIELD

An embodiment of the present disclosure relates to the field of mobile laser defense, and specifically, to a mobile laser denial defense system.

BACKGROUND

For the safety protection of important facilities, potential threats are rejected and interfered by arranging various protective equipment. At present, the commonly used method for identifying and denying threat targets is to detect threat targets by radar and then interfere with the threat targets by protective equipment. However, this method is only suitable for large threat targets. For small threat targets, this method has a slow response speed, and traditional protective equipment is inconvenient to operate, which affects the interference efficiency of threat targets.

The above information disclosed in the background section is only for enhancement of understanding of the concept background of the present inventive, and therefore the above information may contain information that does not form the prior art that is already known to those of ordinary skill in the art in China.

SUMMARY

The content of the present disclosure is used to introduce concepts in a simplified form, and these concepts are described in detail in the following detailed description. The content of the present disclosure is not intended to identify the key features or essential features of the claimed technical solution, nor is the content intended to be used to limit the scope of the claimed technical solution.

Some embodiments of the present disclosure propose a mobile laser denial defense system to address one or more of the technical problems mentioned in the background section above.

According to a first aspect, some embodiments of the present disclosure provide a mobile laser denial defense system. The mobile laser denial defense system includes: a mobile base vehicle, a pan/tilt head, a camera, an image processing device, a laser host, a laser, a cooling system, a control device, and an automatic cruise and obstacle avoidance system; wherein a mobile base on the mobile base vehicle is configured to bear the pan/tilt head, the camera, the laser host, the laser, the cooling system, the control device and the automatic cruise and obstacle avoidance system, the mobile base vehicle is provided with omnidirectional wheels or tracks, the mobile base is arranged on the mobile base vehicle, the mobile base vehicle supports the mobile base to move and steer in a plurality of directions, and the laser host is arranged on the mobile base; the pan/tilt head is mounted on the mobile base and configured to mount the camera and the laser, the pan/tilt head is provided with a laser source, a first hole position and a second hole position, the camera is mounted on the first hole position, and the laser is connected to a laser source by a telescopic optical fiber and is mounted on the second hole position of the pan/tilt head; the camera is in communication connection with the image processing device and the control device, and is configured to perform real-time monitoring and target identification and transmit captured image data to the image processing device for image detection, and the image processing device transmits detected image data to the control device for processing; the laser is fixed on the pan/tilt head and is connected to the laser host by a telescopic optical fiber, and the laser is in communication connection with the control device; the cooling system is connected to the laser and configured to dissipate heat from the laser, the cooling system is connected to the laser by a coolant pipeline, and coolant in the coolant pipeline circulates between the laser and the cooling system; the control device is connected to the camera and the laser, processes image data transmitted by the camera in real time, identifies a target and controls the laser to perform laser strikes, and the control device is also connected to the cooling system to monitor a temperature state of the cooling system in real time; and the automatic cruise and obstacle avoidance system is integrated in the mobile base, detects a surrounding environment by a sensor, and transmits data to the control device to adjust a traveling route so as to achieve automatic cruise and obstacle avoidance.

Optionally, the mobile laser denial defense system further includes: a power supply system, and a communication module, wherein the power supply system provides power for components by a power line, and the communication module is connected to components by a bus or in a wireless communication mode to achieve real-time transmission and remote control of information.

Optionally, the control device is configured to: initialize the power supply system, the pan/tilt head, the camera, a lidar, the cooling system, and the automatic cruise and obstacle avoidance system; send a state query instruction to components by the communication module, detect whether the power supply system is normal, detect whether the automatic cruise and obstacle avoidance system provides data, detect whether states of the pan/tilt head, the camera and the laser are normal, and detect whether operation of the cooling system is normal; and send a cruise instruction to the automatic cruise and obstacle avoidance system in response to determining that the automatic cruise and obstacle avoidance system is normal.

Optionally, the camera is configured to: acquire image data in real time, and transmit the acquired image data to the image processing device; the image processing device is configured to: perform denoising, graying and normalization on the acquired image data to obtain processed image data; and perform target detection and identification on the processed image data by using a pre-trained target detection model to obtain a target identification result, and send the target identification result to the control device; and the control device is configured to: receive the target identification result sent by the image processing device, judge whether the target identification result represents a threat object in a blacklist according to the target identification result; if the target identification result represents the threat object in the blacklist, control the laser to perform laser strikes; if the target identification result represents a whitelist object, continue to instruct the automatic cruise and obstacle avoidance system to cruise; if the target identification result cannot be judged, control an associated alarm device to send a warning signal and record the target identification result.

Optionally, the control device is further configured to: calculate coordinates and a distance of the center point of the target according to target position information included in the target identification result; determine an actual distance and a relative position of the target by parameters of focal length and field of view of the camera; send rotation and pitching adjustment instructions to the pan/tilt head to align a laser transmitter head with the center of the target; and adjust an output power of the laser according to the actual distance, and send a striking instruction to the laser.

Optionally, the automatic cruise and obstacle avoidance system includes: a lidar, a sensor and an obstacle avoidance apparatus, wherein the lidar and the sensor are in communication connection with the obstacle avoidance apparatus, the lidar and the sensor scan a surrounding environment in real time and transmit environment scanning data to the obstacle avoidance apparatus; and the obstacle avoidance apparatus is configured to: analyze the environmental scanning data, detect a position and a distance of an obstacle ahead; if the distance of the obstacle is less than a set safety threshold, label the position of the obstacle as a direction of the obstacle; in response to determining that the obstacle is ahead and a number of the obstacles is greater than or equal to a first preset number, determine a direction in which a number of the obstacles at a left side or a right side is less than or equal to a second preset number as a travel direction, and send the travel direction to the control device; and in response to determining that the number of the obstacles ahead is less than or equal to a first preset number and the distance of the obstacle ahead is greater than a preset distance, generate a deceleration instruction, and send the deceleration instruction to the control device.

Optionally, the control device is configured to: in response to receiving the travel direction sent by the obstacle avoidance apparatus, control the mobile base vehicle to travel in the travel direction; in response to receiving the deceleration instruction sent by the obstacle avoidance apparatus, control the mobile base vehicle to decelerate; in response to determining that the mobile base vehicle has completed obstacle avoidance, control the mobile base vehicle to resume a cruise state.

The foregoing embodiments of the present disclosure have the following beneficial effects: according to the mobile laser denial defense system of some embodiments of the present disclosure, efficient area monitoring and defense are achieved, and potential threats are discovered and handled timely; flexible mobility is provided to adapt to various terrains and environments; advanced cameras and image processing algorithms can identify and track targets in real time, and can even distinguish between different types of threats. Combined with artificial intelligence technology, automated threat assessment and response strategies may be implemented. The combination of predetermined routes and dynamic obstacle avoidance ensures that the system covers the protective area efficiently. New laser technologies offer increased power and efficiency, enabling more effective denial or destruction of targets. The base vehicle is designed to be more flexible and can adapt to a variety of terrains, including flat ground, slopes, grass and sand, ensuring that the system can operate normally in various environments. This novel system has significantly improved energy management and heat dissipation, adopts a more efficient cooling system, and ensures long-term efficient operation. Modern lasers have high precision, long-range strike capabilities, and can be deployed quickly. Compared with traditional protective equipment, the laser denial system can effectively interfere with/deny the target in a short time.

BRIEF DESCRIPTION OF THE DRAWINGS

The above and other features, advantages and aspects of the embodiments of the present disclosure become more apparent with reference to the following detailed description in conjunction with the accompanying drawings. Throughout the accompanying drawings, the same or similar reference numerals refer to the same or similar elements. It should be understood that the accompanying drawings are schematic and that components and elements are not necessarily drawn to scale.

DETAILED DESCRIPTION OF THE EMBODIMENTS

Hereinafter, embodiments of the present disclosure are described in detail with reference to the accompanying drawings. Although some embodiments of the present disclosure are shown in the accompanying drawings, it should be understood that the present disclosure may be implemented in various forms and should not be construed as limited to the embodiments set forth herein. Rather, these embodiments are provided to provide a thorough and complete understanding of the present disclosure. It should be understood that the accompanying drawings and embodiments of the present disclosure are only used for illustrative purposes and are not used to limit the protection scope of the present disclosure.

It should also be noted that, for the convenience of description, only the parts related to the present invention are shown in the accompanying drawings. The embodiments and features in the embodiments of the present disclosure can be combined with each other without conflict.

It should be noted that the concepts such as "first" and "second" mentioned in the present disclosure are only used to distinguish different devices, modules or units, and are not used to limit the order or interdependence of the functions performed by these devices, modules or units.

It should be noted that the modifications of "a" and "a plurality of" mentioned in the present disclosure are illustrative rather than restrictive, and those skilled in the art should understand that unless otherwise clearly indicated in the context, it should be understood as "one or more".

The names of the messages or information exchanged between a plurality of apparatuses in the embodiments of the present disclosure are only used for illustrative purposes and are not used to limit the scope of these messages or information.

The present disclosure is described in detail below with reference to the accompanying drawings and the embodiments.

Figure 1:
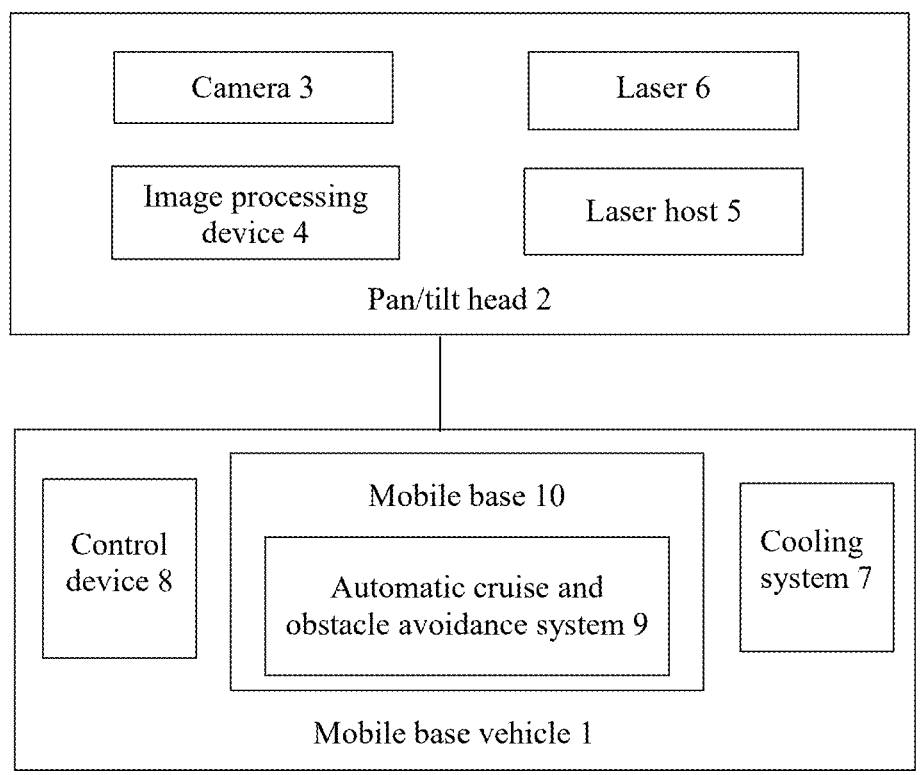
FIG. 1 is a schematic system architecture diagram of a mobile laser denial defense system according to the present disclosure.

FIG. 1 is a schematic system architecture diagram of a mobile laser denial defense system according to the present disclosure. A system architecture of a mobile laser denial defense system according to the present disclosure is shown. The mobile laser denial defense system includes: a mobile base vehicle 1, a pan/tilt head 2, a camera 3, an image processing device 4, a laser host 5, a laser 6, a cooling system 7, a control device 8, and an automatic cruise and obstacle avoidance system 9.

In some embodiments, a mobile base on the mobile base vehicle is configured to bear the pan/tilt head, the camera, the laser host, the laser, the cooling system, the control device and the automatic cruise and obstacle avoidance system, wherein the mobile base vehicle is provided with omnidirectional wheels or tracks, the mobile base is arranged on the mobile base vehicle, the mobile base vehicle supports the mobile base to move and steer in a plurality of directions, and the laser host is arranged on the mobile base.

The mobile base vehicle 1 may be a universal mobile base vehicle. A chassis (mobile base) is a basic structure of the entire system, which is mounted on a vehicle that may move in all directions, and can achieve multi-directional movement by adopting omnidirectional wheels or tracks, including forward, backward, left and right lateral movement and in-situ rotation. The working principle of the mobile base vehicle 1 is as follows: the wheels or the tracks of the vehicle are driven by a motor to achieve moving and positioning; the built-in control device controls a driving route of the vehicle by receiving signals from the automatic cruise and obstacle avoidance system and the obstacle avoidance apparatus. The mobile base vehicle 1 functions to provide the mobile capability of the system, so that the system can flexibly move in a designated area to cover more protection ranges. The obstacle avoidance apparatus ensures that the vehicle avoids colliding with obstacles in the moving process.

Figure 2:
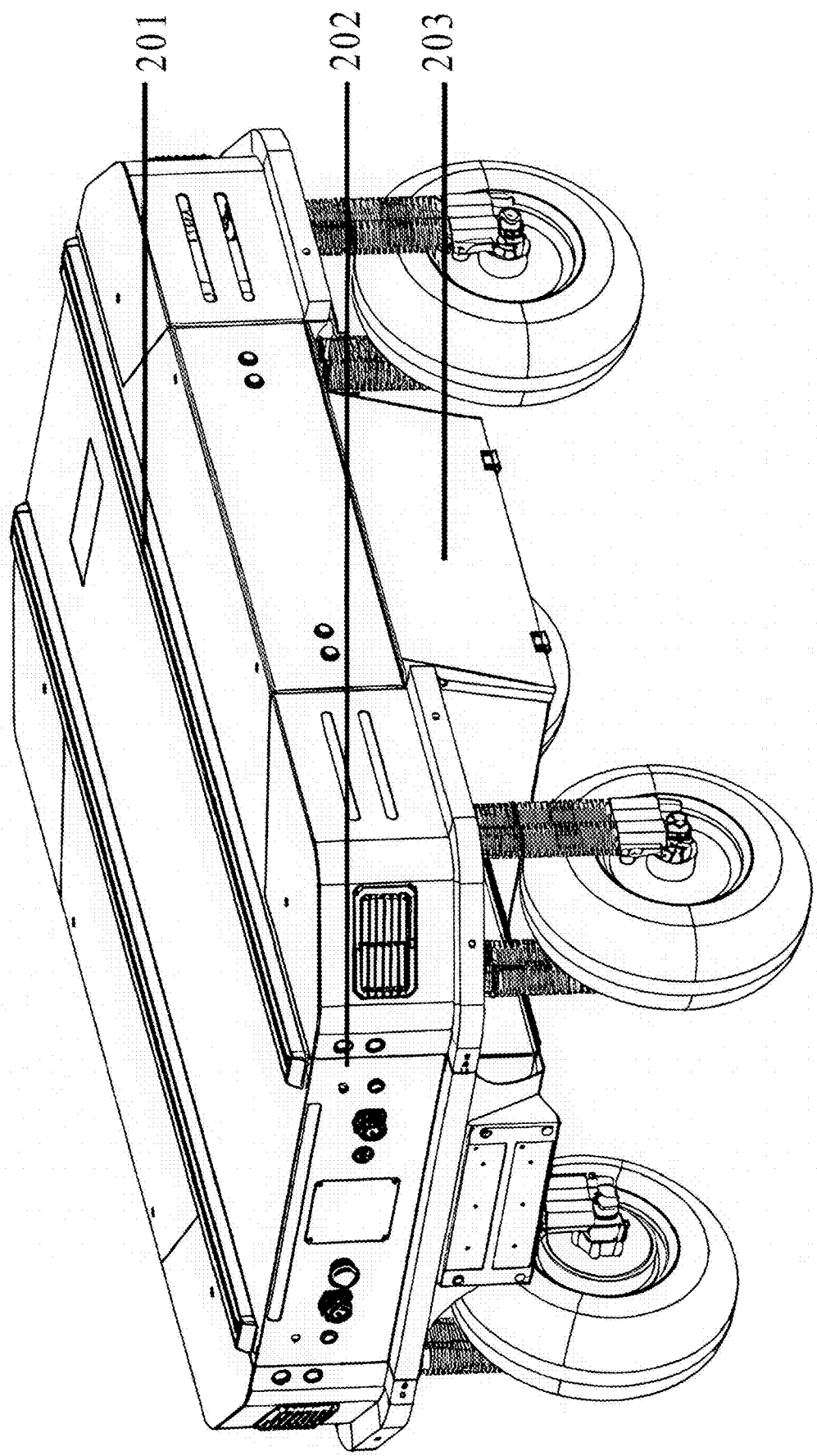
FIG. 2 is a framework diagram of an application scenario of a mobile base vehicle in a mobile laser denial defense system.

As an example, FIG. 2 is a framework diagram of an application scenario of the mobile base vehicle 1, and the mobile base vehicle 1 may include a profile bracket 201, a tail electrical panel 202, and a battery compartment 203. The profile bracket 201 may represent a bracket on the mobile base vehicle 1 for fixing the pan/tilt head. The rear electrical panel 202 may represent an electrical panel of the mobile base vehicle 1 and may include: a power supply knob, configured to control a power supply switch of the vehicle, specifically, turning right to turn on the power supply and turning left to turn off the power, a manual/auto button, a left turn button, a right turn button, and an emergency stop button. The battery compartment 203 may be configured to house a power supply system.

The pan/tilt head 2 is a bracket that can rotate and pitch, and is configured to mount the camera 3 and the laser 6. The camera 3 is configured for monitoring and target identification, and the laser 6 is configured to emit laser for denial. The image processing device 4 and the laser host 5 may also be arranged on one side of the pan/tilt head equipped with the camera 3 and the laser 6; the image processing device 4 may be an image processor built in the camera 3, and may be configured for target identification. The laser host 5 may be a controller provided inside the laser 6 and configured to control the laser to perform laser emission. The laser 6 is a box body and a laser head, which are connected by a telescopic optical fiber.

The working principle of the pan/tilt head 2 may be as follows: the pan/tilt head is controlled by a motor to achieve omnidirectional rotation and pitching, so as to track and position a target; the camera captures a video, and an image processing algorithm identifies the position and features of a target; and the laser emits a high-energy laser beam after receiving instructions to deny or interfere with the target. The functions of the pan/tilt head 2 equipped with the camera 3 and the laser 6 may be as follows: the camera monitors the surrounding environment in real time, identifies and locates potential threats; the laser emits high-energy laser to warn, interfere with or destroy the target. For example, the system parameters of the pan/tilt head 2 may be: a rotational angle of 360 degrees, a pitch angle of −45 degrees to +45 degrees, a camera resolution of 1080 p; and a laser power of 500 W.

The cooling system 7 may be configured to dissipate heat, which ensures that the laser and other electronic components remain within a safe temperature range when operating at high power. The working principle of the cooling system 7 is as follows: a coolant is circulated with heat sinks of the laser and electronic components by a water pump to remove excess heat; a radiator and a fan release the absorbed heat into the air. That is, the cooling system 7 may include a water pump, a coolant, a heat dissipation fan, and a fan. The functions of the cooling system 7 are as follows: the working temperature of the laser and electronic components is maintained to prevent overheating from causing system damage or performance degradation, so that the operating efficiency and life of the system are improved.

The control device 8 may refer to an edge computing box (control module), which is connected to the camera and the laser, processes the image data transmitted by the camera in real time, and identifies the target and issues laser strike instructions. The control device is connected to the power supply system and the cooling system, monitors the power and temperature status of the system in real time, and ensures the normal operation of the system. For example, the control device 8 may be a Nvidia Xavier NX edge computing box.

The automatic cruise and obstacle avoidance system 9 is integrated on an automatic cruise and obstacle avoidance apparatus on the chassis of the vehicle for autonomous navigation and obstacle avoidance, ensuring that the system automatically patrols within the set area. The working principle of the automatic cruise and obstacle avoidance system 9 may be as follows: automatic cruise is achieved by a global positioning system (GPS) and an inertial navigation system, and moving is achieved along a predetermined route; a lidar or an ultrasonic sensor detect surrounding obstacles in real time, and the control device adjusts the route in time to avoid obstacles. The working principle of the automatic cruise and obstacle avoidance system 9 may be as follows: automatic patrol is achieved, and the area coverage rate and the protection efficiency are improved; the obstacle avoidance function ensures the safe operation of the system and avoids collision and damage. For example, the system parameters of the automatic cruise and obstacle avoidance system 9 may be as follows: a navigation precision of +0.5 m and an obstacle avoidance distance of 0.5-2 m.

In some embodiments, the pan/tilt head is mounted on a mobile base for mounting a camera and a laser. The pan/tilt head is provided with a laser source, a first hole position and a second hole position, the camera is mounted on the first hole position, and the laser is connected to a laser source by a telescopic optical fiber and is mounted on the second hole position of the pan/tilt head.

Figure 3:
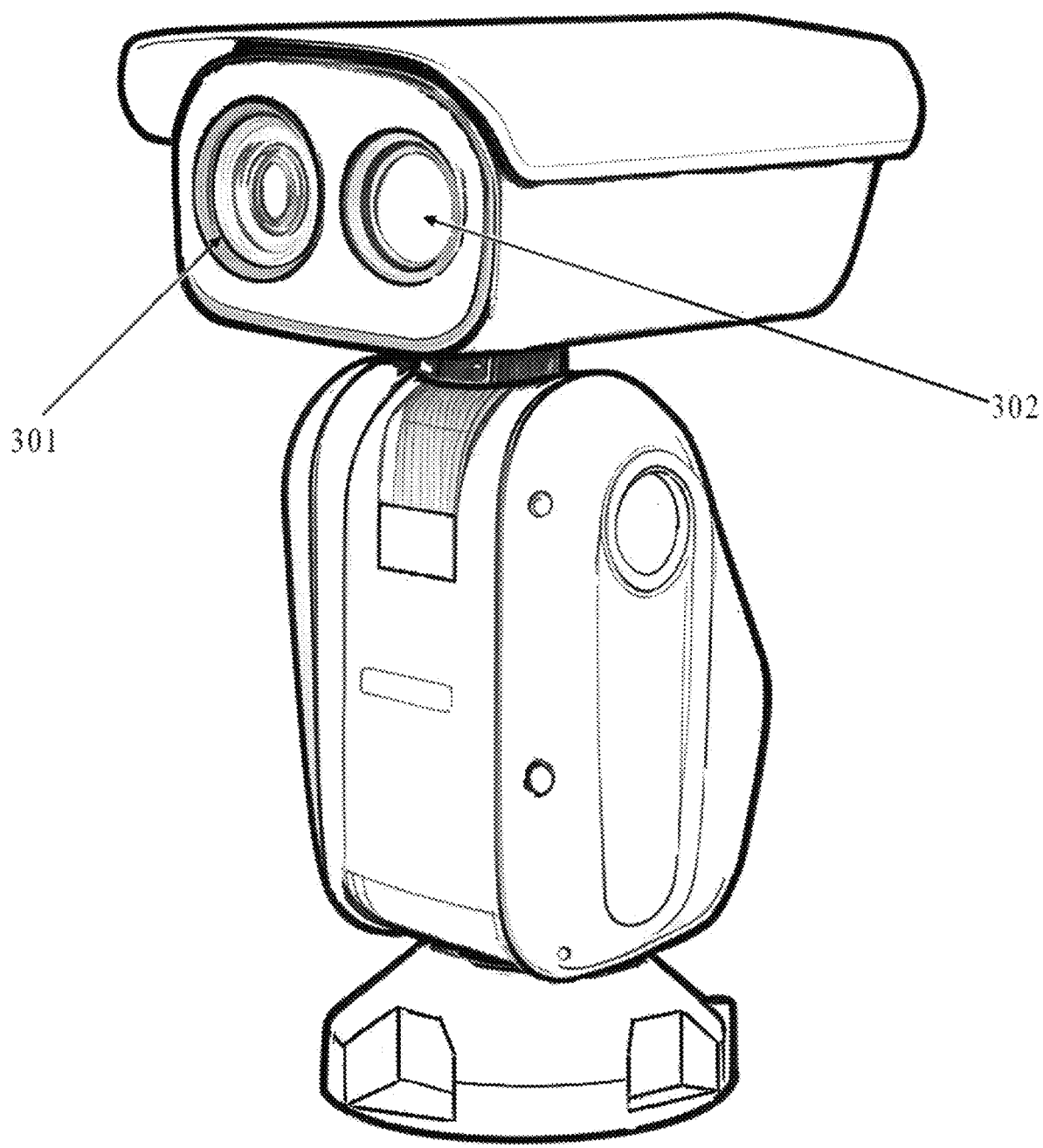
FIG. 3 is a diagram of an application scenario of an internal test device for a first hole position and a second hole position of a pan/tilt head in a mobile laser denial defense system according to the present disclosure.

As an example, FIG. 3 is a diagram of an actual device application scenario of an internal test of positions of a first hole position 301 and a second hole position 302 on a pan/tilt head. When the model is manufactured, the box body is required to be fixed on the mobile base vehicle 1, and the laser penetrates through the first hole position of the pan/tilt head, namely, the camera is arranged at the first hole position of the pan/tilt head, and the laser is arranged at the second hole position of the pan/tilt head.

In some embodiments, the camera is in communication connection with the image processing device and the control device, and is configured to perform real-time monitoring and target identification and transmit captured image data to the image processing device for image detection; and the image processing device transmits detected image data to the control device for processing. The image processing device may analyze the image data transmitted by the camera with image identification and machine learning algorithms to identify whether the target is threatening (such as an illegal intruder, a wild animal, and an unmanned aerial vehicle).

In some embodiments, the laser is fixed on the pan/tilt head and is connected to the laser host by a telescopic optical fiber, and the laser is in communication connection with the control device.

In some embodiments, the cooling system is connected to the laser for dissipate heat from the laser. The cooling system is connected to the laser by a coolant pipeline, and coolant in the coolant pipeline circulates between the laser and the cooling system. The cooling system is connected to the laser and is responsible for heat dissipation of the laser and other electronic elements, which ensures stability of the system in high-power operation. The coolant circulates between the laser and the cooling device via pipes to ensure that the laser is maintained within a safe temperature range.

In some embodiments, the control device is connected to the camera and the laser, processes image data transmitted by the camera in real time, identifies a target and controls the laser to perform laser strikes; and the control device is also connected to the cooling system to monitor a temperature state of the cooling system in real time.

In some embodiments, the automatic cruise and obstacle avoidance system is integrated in the mobile base, detects a surrounding environment by a sensor, and transmits data to the control device to adjust a traveling route so as to achieve automatic cruise and obstacle avoidance.

Optionally, the mobile laser denial defense system further includes: a power supply system, and a communication module, wherein the power supply system provides power for components by a power line, and the communication module is connected to components by a bus or in a wireless communication mode to achieve real-time transmission and remote control of information. The communication module supports dual-channel data transmission via GPRS and short messages and supports multi-center data communication.

It should be noted that, the camera captures a target image, the target image is transmitted to the control device for analysis, and after the target is identified, the control device instructs the pan/tilt head to adjust the laser to strike. The power supply system provides power to the entire system, and the cooling system ensures that the laser maintains normal temperature when working. The automatic cruise and obstacle avoidance system ensures that the system can automatically avoid obstacles during traveling and then complete area defense. The power supply system may be configured to provide stable power supply for the system, includes a battery pack and a charging management system, and ensures that the system can still normally operate under the condition of power failure. The working principle of the power supply system may be as follows: when normal power is supplied, the battery system supplies power and charges the system; when power is interrupted, the battery system automatically switches to battery power supply mode to ensure continuous operation of the system.

Optionally, the control device is configured to: initialize the power supply system, the pan/tilt head, the camera, a lidar, the cooling system, and the automatic cruise and obstacle avoidance system; send a state query instruction to components by the communication module, detect whether the power supply system is normal, detect whether the automatic cruise and obstacle avoidance system provides data, detect whether states of the pan/tilt head, the camera and the laser are normal, and detect whether operation of the cooling system is normal; and send a cruise instruction to the automatic cruise and obstacle avoidance system in response to determining that the automatic cruise and obstacle avoidance system is normal.

Therefore, to cope with different types of threats, modern systems integrate a variety of sensors, such as a lidar, a thermal imaging sensor and an ultrasonic sensor, and improve environmental perception and target identification capabilities with data fusion.

The System Startup and Cruise Logic is as Follows:

Step I. Initialization: when the system starts, the control device initializes all components including a power supply system, a pan/tilt head, a camera, a lidar, an ultrasonic sensor and the like, and ensures that each module is in a standby state.

Step II. The control device sends a state query instruction to components by the communication module, detects whether the power supply is normal, whether the sensor can provide data, and whether the states of the laser and the pan/tilt head are good, so that the operation reliability of the system is ensured.

Step III. The mobile base vehicle receives a cruise command of the control device and starts cruise along a preset route. In the cruise process, the lidar and the ultrasonic sensor (the automatic cruise and obstacle avoidance system) scan the environment ahead in real time and monitor obstacles.

For example, after the system is powered on, the mobile base on the mobile base vehicle starts to perform an automatic cruise task. The cruise path is controlled by a preset navigation system (such as GPS, inertial navigation, and visual navigation), and the system moves in a set area through position information acquired in real time.

Optionally, the camera is configured to: acquire image data in real time, and transmit the acquired image data to the image processing device.

Optionally, the image processing device is configured to: perform denoising, graying and normalization on the acquired image data to obtain processed image data; and perform target detection and identification on the processed image data by using a pre-trained target detection model to obtain a target identification result, and send the target identification result to the control device. The camera starts to monitor the surrounding environment in real time and transmits the video data to the image processing device for processing. The image processing device analyzes the image data transmitted by the camera with image identification and machine learning algorithms to identify whether the target is threatening (such as an illegal intruder, a wild animal, and an unmanned aerial vehicle).

The image processing logic is as follows: the pan/tilt camera acquires image data in real time and transmits the image data to the image processing device. The image processing device performs preprocessing such as denoising, graying and normalization on the acquired images to extract effective features of the images. The image processing device detects and identifies a target with a pre-trained deep learning model (such as YOLOv5), and sends the detection results (including a position, category and size of the target) to the control device.

Optionally, the control device is configured to: receive the target identification result sent by the image processing device, judge whether the target identification result represents a threat object in a blacklist according to the target identification result; if the target identification result represents the threat object in the blacklist, control the laser to perform laser strikes; if the target identification result represents a whitelist object, continue to instruct the automatic cruise and obstacle avoidance system to cruise; and if the target identification result cannot be judged, control an associated alarm device to send a warning signal and record the target identification result.

It should be noted that a whitelist is an allowed list that contains objects or entities identified by the system as trustworthy and safe. In a mobile laser denial defense system, the whitelist usually includes friendly personnel, friendly equipment, authorized vehicles and the like. The working principle of the whitelist is as follows: the system verifies whether an object entering a protective area is in a whitelist with various identification technologies (such as face identification, radio-frequency identification (RFID), and Bluetooth beacon); when the system detects this object in the whitelist, the activity of the object is automatically ignored or recorded, and no alarm or defense is triggered. The functions of the whitelist are as follows: 1. False alarm prevention: misidentification and interference of friendly targets are reduced, which ensures the normal operation of the system without affecting daily activities; 2. Efficiency improvement: by excluding objects in the whitelist, resources and attention may be focused on potential threats, which improves the working efficiency of the system.

A blacklist is a deny list containing objects or entities identified by the system as potential threats or unwelcome. In mobile laser denial defense systems, blacklists typically include known intruders, unauthorized vehicles or devices, and the like. The working principle of the blacklist is as follows: the system monitors the protective area in real time with the camera, the sensor and other devices to identify whether there are objects in the blacklist; once an object in the blacklist is detected, the system immediately triggers an alarm and activates defense measures, such as emitting lasers for denial or notifying security personnel. The functions of the blacklist are as follows: 1. Enhanced security: potential threats are discovered and responded to in a timely manner to prevent unauthorized entry and destructive behavior; 2. Automatic response: blacklist objects are processed automatically to improve the response speed and efficiency of the system and reduce human intervention.

Data management of whitelist and blacklist: 1. Dynamic update: whitelist and blacklist data may be dynamically updated and maintained by the management platform. The list is constantly updated by real-time data analysis and threat assessment. 2. Data synchronization: the system supports data synchronization with external databases or other security systems to ensure the timeliness and accuracy of the list.

Security policies for whitelists and blacklists: 1. Rule setting: administrators may set different rules based on different security policies, such as allowing certain specific personnel to enter during working hours, or triggering stricter monitoring and defense measures under specific circumstances; 2. Permission management: Different levels of permission management are set to ensure that only authorized personnel may access and modify whitelists and blacklists to prevent data from being maliciously tampered.

In some embodiments, the target detection and identification may include the following processing steps:

Step I. Model loading: the YOLOv5 model is used for target detection. The model may identify specific types of targets by training locally.

Step II. Camera capture: the real-time camera image is read by OpenCV.

Step III. Target detection: in each frame, the YOLO model is used to detect the target and extract the position and category of the target.

Step IV. Target screening: according to the detected target category, whether the target belongs to the blacklist is judged. A simple distance estimation is performed by calculating the size of the target border.

Step V. Laser control: If the target is within the strike distance threshold, the laser control function control_laser is called to execute the laser strike.

Step VI. Image display: the target is labeled and displayed on the image.

Step VII. Distance estimation: through the calibration parameters of the camera, a more accurate target distance can be obtained using triangulation.

Step VIII. Target tracking: Tracking algorithms (such as Deep SORT) may be used to track the target and adjust the laser strike position in combination with motion prediction.

Step IX. Multi-sensor fusion: data from sensors such as a lidar and a thermal imaging sensor are combined to achieve more comprehensive target identification and tracking.

As an example, the code corresponding to target detection and identification is as follows:

```
{import cv2
import torch
import numpy as np
# load the pre-trained YOLOv5 model
model = torch.hub.load('ultralytics/yolov5', 'yolov5s') # Change to a more suitable model
# camera capture
cap = cv2. VideoCapture(0) # 0 means use the default camera
# whitelist and blacklist
whitelist = ["authorized_personnel"]
blacklist = ["intruder"]
# target tracker initialization
tracker = cv2. TrackerKCF_create( )
# set a distance threshold of laser strike and laser transmitter head control
laser_distance threshold = 100 # set the distance threshold of the strike
def control_laser(x, y, distance):
    # laser positioning control logic
    if distance < laser_distance_threshold:
        print(f"Target at ({x}, {y}), distance: {distance} – Engaging laser!")
        # call the laser system interface code to activate the laser
    else:
        print(f"Target at ({x}, {y}), distance: {distance} – Target out of range")
# main loop
```

```
while True:
    ret, frame = cap.read( )
    if not ret:
        break
    # image processing and target detection
    results = model(frame)
    detections = results.xyxy[0].numpy( ) # detection results: x1, y1, x2, y2, conf, class
    # target screening and processing
    for *bbox, conf, cls in detections:
        x1, y1, x2, y2 = map(int, bbox)
        label = model.names[int(cls)]
        # judge whether in blacklist
        if label in blacklist:
            # calculate a center position and distance of the target (simplified distance
estimation)
            center_x, center_y = (x1 + x2)//2,(y1 + y2) // 2
            distance = np.sqrt((x2 - x1) ** 2+ (y2 - y1) ** 2) # simplify the distance
estimation to a border size
            # draw the border
            cv2.rectangle(frame, (x1, y1), (x2, y2), (0, 0, 255), 2)
            cv2.putText(frame, f"{label} {conf:.2f}", (x1, y1 - 10),
cv2.FONT_HERSHEY_SIMPLEX, 0.5, (0, 0, 255), 2)
            # laser strike judgment and control
            control_laser(center_x, center_y, distance)
        else:
            # non-blacklisted targets are labeled in green
            cv2.rectangle(frame, (x1, y1), (x2, y2), (0, 255, 0), 2)
    # display the processed image
    cv2.imshow('Laser Defense System', frame)
    # exit conditions
    if cv2.waitKey(1) & 0xFF == ord('q'):
        break
cap.release( )
cv2.destroy All Windows( )}.
```

Optionally, the control device is further configured to: calculate coordinates and a distance of the center point of the target according to target position information included in the target identification result; determine an actual distance and a relative position of the target by parameters of focal length and field of view of the camera; send rotation and pitching adjustment instructions to the pan/tilt head to align a laser transmitter head with the center of the target; and adjust an output power of the laser according to the actual distance, and send a striking instruction to the laser.

The operating logic of laser aiming and striking is as follows:

Step I. The control device calculates the coordinates and the distance of the center point of the target according to target position information provided by the image processing device, and determine an actual distance and a relative position of the target by parameters of focal length and field of view of the camera.

Step II. The control device sends rotation and pitch adjustment instructions to the pan/tilt head to align the laser transmitter head with the center of the target; the two axes of the pan/tilt head are precisely adjusted according to the target coordinates to achieve aiming without blind spots.

Step III. According to the target distance, the control device adjusts the output power of the laser to achieve the optimal striking effect.

Step IV. When the target position, distance, laser power and other conditions satisfy the preset strike requirements, the control device issues a laser strike command, and the laser starts to strike the target.

Optionally, the automatic cruise and obstacle avoidance system includes: a lidar, a sensor and an obstacle avoidance apparatus, wherein the lidar and the sensor are in communication connection with the obstacle avoidance apparatus, and the lidar and the sensor scan a surrounding environment in real time and transmit environment scanning data to the obstacle avoidance apparatus.

Optionally, the obstacle avoidance apparatus is configured to: analyze the environmental scanning data, detect a position and a distance of an obstacle ahead; if the distance of the obstacle is less than a set safety threshold, label the position of the obstacle as a direction of the obstacle; in response to determining that the obstacle is ahead and a number of the obstacles is greater than or equal to a first preset number, determine a direction in which a number of the obstacles at a left side or a right side is less than or equal to a second preset number as a travel direction, and send the travel direction to the control device; and in response to determining that the number of the obstacles ahead is less than or equal to a first preset number and the distance of the obstacle ahead is greater than a preset distance, generate a deceleration instruction, and send the deceleration instruction to the control device.

Optionally, the control device is configured to: in response to receiving the travel direction sent by the obstacle avoidance apparatus, control the mobile base vehicle to travel in the travel direction; in response to receiving the deceleration instruction sent by the obstacle avoidance apparatus, control the mobile base vehicle to decelerate; in response to determining that the mobile base vehicle has completed obstacle avoidance, control the mobile base vehicle to resume a cruise state.

The obstacle avoidance logic is as follows:

Step I. Real-time environment perception: the lidar and the ultrasonic sensor scan the surrounding environment in real time and transmit distance data to the obstacle avoidance module.

Step II. Obstacle detection: the obstacle avoidance module analyzes the sensor data to detect the position and distance of the obstacle ahead. If the obstacle distance is less than a set safety threshold, the obstacle position is labeled as the obstacle direction.

Step III. Obstacle avoidance decision: the control module executes obstacle avoidance logic based on the obstacle position:
1. If there are many obstacles ahead, whether there are fewer obstacles at a left side or a right side is judged, and then one side with fewer obstacles is selected.
2. If there are few obstacles and the distance between the obstacles is far, advancement at a reduced speed is performed.
3. When the obstacles are avoided successfully, the original cruise route is resumed.

Step IV. Path adjustment: the obstacle avoidance module sends the result of the obstacle avoidance decision to the control module, which then adjusts the direction and speed of the mobile chassis to ensure that the system continues to cruise after bypassing the obstacle. In some embodiments, obstacle avoidance logic may include:

Step I. The obstacle avoidance apparatus reads the data from the lidar or ultrasonic sensor to obtain the distance information of the surrounding environment.

Step II. The obstacle avoidance apparatus identifies the direction and distance of the obstacle ahead by analyzing the distance information provided by the sensor.

Step III. If the distance in a certain direction ahead is less than a safety distance threshold, the obstacle avoidance apparatus determines that there is an obstacle in this direction.

Step IV. The obstacle avoidance apparatus selects the appropriate direction to avoid the obstacle based on the position and distance of the obstacle.

Step V. The control device adjusts the movement path of the mobile base vehicle according to the position of the obstacle and changes the direction to bypass the obstacle.

Step VI: The control device controls the movement of the vehicle, and the vehicle resumes the original route after bypassing the obstacle.

As an example, the code corresponding to the obstacle avoidance logic is as follows:

```
{import numpy as np
#set safe distance threshold
SAFE_DISTANCE=0.5 #in meter
#scanning angle range of lidar (assuming 360 degrees)
SCAN_ANGLE=360
#simulate the distance data of the lidar (in meter), the array length is equal to the scanning angle range
#assume that each element represents the distance value of the lidar in one direction
lidar_distances=np.random.uniform (0.3, 5.0, SCAN_ANGLE) #simulate lidar data
#obstacle avoidance algorithm
def obstacle_avoidance (lidar_distances):
    #find a direction that is less than a safe distance, indicating that there is an obstacle
    obstacles=np.where
        (lidar_distances<SAFE_DISTANCE) [0]
    #judge a number of obstacles ahead
    if len (obstacles)==0:
        print ("the path is clear, keep moving forward")
        return 'forward' #no obstacles, keep moving forward
    #find the direction with the most obstacles (as the direction to avoid) obstacle_direction=np.mean (obstacles)
    #select a direction to bypass obstacles
    if 0<=obstacle_direction<180:
        #the obstacle is on the left, move right to avoid the obstacle
        print (f"the obstacle is on the left ({obstacle_direction} degrees), move right to avoid the obstacle.")
        return 'right'
    else:
        #the obstacle is on the right, move left to avoid the obstacle
        print (f"the obstacle is on the right ({obstacle_direction} degrees), move left to avoid the obstacle.")
        return 'left'
#simulate obstacle avoidance decision
direction=obstacle_avoidance (lidar_distances)
#control the movement direction of the vehicle
def control_vehicle (direction):
    if direction=='forward':
        print ("forward")
        #call the mobile control interface to perform the forward operation
    elif direction=='left':
        print ("turn left")
        #call the mobile control interface to perform the turn-left operation
    elif direction=='right':
        print ("turn right")
        #call the mobile control interface to perform the turn-right operation
#perform obstacle avoidance control
control_vehicle (direction)}.
```

Therefore, the system obtains environmental information and target status in real time and dynamically adjusts the working status of the components. Automatic cruise, target identification, strike, obstacle avoidance and feedback adjustment are achieved, and human intervention is reduced. Through the integration of a deep learning model, a lidar and multiple sensors, the accuracy of target identification and the high efficiency of obstacle avoidance are ensured.

The above description is only an illustration of some preferred embodiments of the present disclosure and the technical principles used. It should appreciated by those skilled in the art that the scope of the present invention in the embodiments of the present disclosure is not limited to the specific combinations of the foregoing features, and other embodiments in which the foregoing features or equivalent features thereof are combined without departing from the spirit of the present invention are also encompassed. For example, the foregoing features are replaced with (but not limited to) technical features with similar functions disclosed in the embodiments of the present disclosure to form a technical solution.

The invention claimed is:

1. A mobile laser denial defense system, comprising: a mobile base vehicle, a pan/tilt head, a camera, an image processing device, a laser host, a laser, a cooling system, a control device, an automatic cruise and obstacle avoidance system, a power supply system, and a communication module; wherein
a mobile base on the mobile base vehicle is configured to bear the pan/tilt head, the camera, the laser host, the laser, the cooling system, the control device and the automatic cruise and obstacle avoidance system, wherein the mobile base vehicle is provided with omnidirectional wheels or tracks, the mobile base is arranged on the mobile base vehicle, the mobile base vehicle supports the mobile base to move and steer in a plurality of directions, and the laser host is arranged on the mobile base;

the pan/tilt head is mounted on the mobile base and configured to mount the camera and the laser, wherein the pan/tilt head is provided with a laser source, a first hole position and a second hole position, the camera is mounted on the first hole position, and the laser is connected to a laser source by a first telescopic optical fiber and is mounted on the second hole position of the pan/tilt head;

the camera is in communication connection with the image processing device and the control device, and is configured to perform real-time monitoring and target identification and transmit captured image data to the image processing device for image detection; and the image processing device transmits detected image data to the control device for processing;

the laser is fixed on the pan/tilt head and is connected to the laser host by a second telescopic optical fiber, and the laser is in communication connection with the control device;

the cooling system is connected to the laser and configured to dissipate heat from the laser, wherein the cooling system is connected to the laser by a coolant pipeline, and coolant in the coolant pipeline circulates between the laser and the cooling system;

the control device is connected to the camera and the laser, processes image data transmitted by the camera in real time, identifies a target and controls the laser to perform laser strikes, and the control device is also connected to the cooling system to monitor a temperature state of the cooling system in real time;

the automatic cruise and obstacle avoidance system is integrated in the mobile base, detects a surrounding environment by a sensor, and transmits data to the control device to adjust a traveling route so as to achieve automatic cruise and obstacle avoidance;

the power supply system provides power for components by a power line, and the communication module is connected to the components by a bus or in a wireless communication mode to achieve real-time transmission and remote control of information;

wherein the control device is configured to:
  initialize the power supply system, the pan/tilt head, the camera, a lidar, the cooling system, and the automatic cruise and obstacle avoidance system;
  send a state query instruction to the components by the communication module, detect whether the power supply system is normal, detect whether the automatic cruise and obstacle avoidance system provides data, detect whether states of the pan/tilt head, the camera and the laser are normal, and detect whether operation of the cooling system is normal; and
  send a cruise instruction to the automatic cruise and obstacle avoidance system in response to determining that the automatic cruise and obstacle avoidance system is normal;

wherein the camera is configured to:
  acquire image data in real time, and transmit the image data to the image processing device;

wherein the image processing device is configured to:
  perform denoising, graying and normalization on the image data to obtain processed image data; and
  perform target detection and identification on the processed image data by using a pre-trained target detection model to obtain a target identification result, and send the target identification result to the control device;

wherein the control device is further configured to:
  receive the target identification result sent by the image processing device, judge whether the target identification result represents a threat object in a blacklist according to the target identification result;
  when the target identification result represents the threat object in the blacklist, control the laser to perform laser strikes;
  when the target identification result represents a whitelist object, continue to instruct the automatic cruise and obstacle avoidance system to cruise; and
  when the target identification result is not judged, control an associated alarm device to send a warning signal and record the target identification result;

wherein the control device is further configured to:
  calculate coordinates and a distance of a center point of the target according to target position information comprised in the target identification result;
  determine an actual distance and a relative position of the target by parameters of focal length and field of view of the camera;
  send rotation and pitching adjustment instructions to the pan/tilt head to align a laser transmitter head with the center of the target; and
  adjust an output power of the laser according to the actual distance, and send a striking instruction to the laser.

\* \* \* \* \*

UNITED STATES PATENT AND TRADEMARK OFFICE
CERTIFICATE OF CORRECTION

| | | |
|---|---|---|
| PATENT NO. | : 12,449,237 B1 | Page 1 of 1 |
| APPLICATION NO. | : 19/235646 | |
| DATED | : October 21, 2025 | |
| INVENTOR(S) | : Yunfeng Yan | |

It is certified that error appears in the above-identified patent and that said Letters Patent is hereby corrected as shown below:

On the Title Page

Item (73) should read:

(73) Assignee: Hainan Research Institute of Zhejiang University, Sanya (CN); Hainan TonglingTechnologyCo.,Ltd, Sanya (CN); Zhejiang University, Hangzhou (CN)

Signed and Sealed this
Twenty-third Day of December, 2025

John A. Squires
*Director of the United States Patent and Trademark Office*